(12) United States Patent
Huston, III et al.

(10) Patent No.: US 10,182,071 B2
(45) Date of Patent: Jan. 15, 2019

(54) PROBABILISTIC TRACKING OF HOST CHARACTERISTICS

(71) Applicant: Arbor Networks, Inc., Burlington, MA (US)

(72) Inventors: Lawrence B. Huston, III, Ann Arbor, MI (US); Mathew R. Richardson, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 189 days.

(21) Appl. No.: 15/224,081

(22) Filed: Jul. 29, 2016

(65) Prior Publication Data

US 2018/0034849 A1 Feb. 1, 2018

(51) Int. Cl.
  *G06F 7/04* (2006.01)
  *H04L 29/06* (2006.01)
(52) U.S. Cl.
  CPC ...... *H04L 63/1458* (2013.01); *H04L 63/0236* (2013.01); *H04L 63/0263* (2013.01)
(58) Field of Classification Search
  CPC ... H04L 63/08; H04L 63/101; H04L 63/0263; H04L 63/1458
  USPC .......................................................... 726/4
  See application file for complete search history.

(56) References Cited

U.S. PATENT DOCUMENTS

| 7,979,694 | B2* | 7/2011 | Touitou | H04L 63/1458 709/229 |
| 8,661,522 | B2* | 2/2014 | Huston, III | H04L 67/02 726/13 |
| 8,793,780 | B2* | 7/2014 | Suffling | H04L 63/1458 713/171 |
| 2013/0031605 | A1* | 1/2013 | Huston, III | H04L 63/1458 726/3 |
| 2013/0132408 | A1* | 5/2013 | Little | G06F 17/3033 707/754 |
| 2013/0212680 | A1* | 8/2013 | Winn | H04L 51/12 726/23 |
| 2013/0347116 | A1* | 12/2013 | Flores | H04L 63/1433 726/25 |
| 2015/0288715 | A1* | 10/2015 | Hotchkiss | H04L 63/0876 726/7 |

* cited by examiner

*Primary Examiner* — Samson B Lemma
(74) *Attorney, Agent, or Firm* — Locke Lord LLP; Scott D. Wofsy; Christopher J. Capelli

(57) ABSTRACT

A system for mitigating network attacks includes a protected network and one or more attack mitigation devices communicatively coupled to the protected network. The attack mitigation devices are configured to receive a request from a host having an IP address and determine whether the IP address is included in a first probabilistic data structure representing addresses of hosts having failed to authenticate using a first authentication procedure. The attack mitigation devices are also configured to perform the first authentication procedure, responsive to a determination that the IP address of the host is not included in the first data structure. The attack mitigation devices are yet further configured to allow the host to access the protected network, responsive to successful completion of the first authentication procedure and to update the first data structure to include the IP address of the host, responsive to unsuccessful completion of the first authentication procedure.

10 Claims, 3 Drawing Sheets

PROBABILISTIC TRACKING OF HOST CHARACTERISTICS

FIELD OF THE INVENTION

Embodiments of the present invention relate generally to computer networks, and specifically to using probabilistic tracking of host characteristics to defeat distributed denial of service attacks.

BACKGROUND OF THE INVENTION

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A DDoS attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, DNS servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

One or more DDoS attack mitigation strategies applied to portions of the network traffic received from a host at a mitigation device may include taking one or more actions to validate the host as legitimate. A predefined mitigation action associated with a DDoS attack can include sending responses to one or more hosts and examining their responses. At least in some instances, this predefined mitigation action can be challenging because based upon the response of the host a different host validation procedure is carried out by a mitigation device. In conventional attack mitigation systems, a mitigation device validates a host using a first validation algorithm, and if the first validation algorithm fails to correctly validate the host as legitimate, then the mitigation device validates the host using a second validation algorithm. If the second validation algorithm fails to correctly validate the host as legitimate, then a third validation algorithm is used by a mitigation device, and so on. As a result, this conventional real-time method of validation of hosts, typically, causes poor user experience for the host being tested (slower website performance, etc.). Slower website performance is known to cause users/visitors to leave the website sooner. Another consequence of poor performance is that the website may be downgraded in search engine results ranking. Therefore, the ability to efficiently test each host and improve user experience, while preventing blocking of valid hosts is advantageous to devices located in a protected network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for mitigating network attacks is provided. The system includes a protected network including a plurality of devices. The system further includes one or more attack mitigation devices communicatively coupled to the protected network. The attack mitigation devices are configured and operable to receive a request to access the protected network from a host having an IP address. The attack mitigation devices are further configured and operable to determine whether the IP address of the host is included in a first probabilistic data structure representing addresses of hosts having failed to authenticate using a first authentication procedure. The attack mitigation devices are also configured and operable to perform the first authentication procedure, responsive to a determination that the IP address of the host is not included in the first probabilistic data structure. The attack mitigation devices are yet further configured and operable to allow the host to access the protected network, responsive to successful completion of the first authentication procedure and to update the first probabilistic data structure to include the IP address of the host, responsive to unsuccessful completion of the first authentication procedure.

In another aspect, an attack mitigation device communicatively coupled to a protected network is provided. The attack mitigation device includes logic integrated with and/or executable by a processor. The logic is adapted to receive a request to access the protected network from a host having an IP address and determine whether the IP address of the host is included in a first probabilistic data structure representing host addresses of hosts having failed to authenticate using a first authentication procedure. The logic is further adopted to perform the first authentication procedure, responsive to a determination that the IP address of the host is not included in the first probabilistic data structure, and allow the host to access the protected network, responsive to successful completion of the first authentication procedure. The logic is further adopted to update the first probabilistic data structure to include the IP address of the host, responsive to unsuccessful completion of the first authentication procedure.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
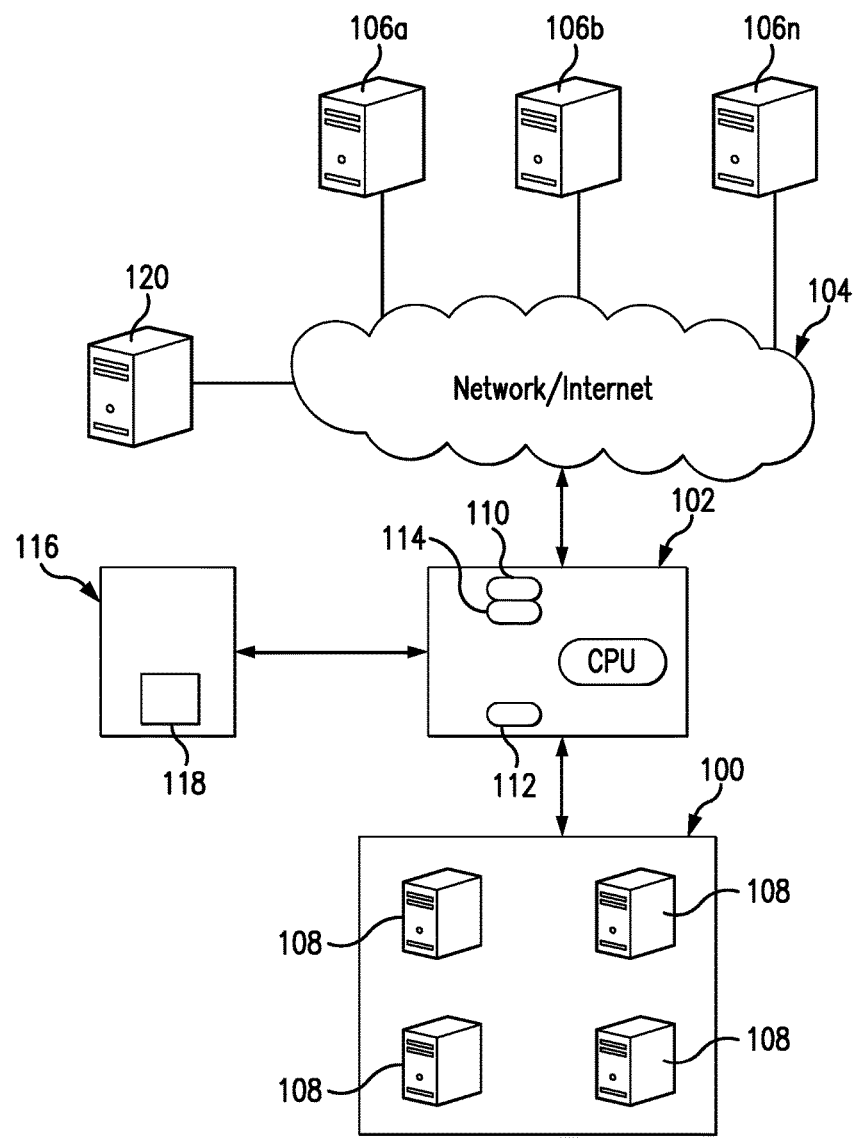
FIG. 1 is a schematic diagram showing network architecture and the relationship between the attack mitigation device and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack on a computer system/device or network.

Turning now descriptively to the drawings, in which similar reference characters denote similar elements throughout the several views, FIG. 1 illustrates the relationship between the protected network 100, attack mitigation device 102, Internet 104, and external host devices 106a, 106b ... 106n.

In a typical implementation, the external host devices 106a, 106b ... 106n (also referred to as external devices or host devices) attempt to connect to protected devices 108 within the protected network 100 typically via a private network or a public computer network such as the Internet 104. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by the attack mitigation device 102 preferably located between the Internet 104 and the protected network 100. Usually, the protected network 100 is an enterprise network, such as a school network, business network, and government network, to list a few examples. In other embodiments, the attack mitigation device 102 is located within the Internet, service provider network or enterprise network rather than as a network edge as illustrated. It is to be appreciated that when deployed within the protected network, traffic is diverted to the mitigation device 102.

The mitigation device 102 preferably includes a packet processing system preferably having an external high-speed network interface 110 and a protected high-speed network interface 112. Under current technology, these interfaces are capable of handling 1.0-100 Gbps, for example. The mitigation device 102 may further include processors 114 that preferably process the packets received at interfaces 110 and 112. Additionally, a central processing unit (CPU), random access memory (RAM), and a storage medium 116 are preferably used to further support the processing of the received packets and are described in detail below in conjunction with FIG. 3. The storage medium 116 also preferably stores host tables 118 used in the below described authenticating process of external device hosts 106a, 106b ... 106n as well as other possible information such as predefined filter rules.

In a typical implementation, the mitigation device 102 authenticates all external host devices 106a, 106b ... 106n before allowing the external devices to access the protected devices 108 within the protected network 100.

To protect against DoS attacks, the mitigation device 102 distinguishes between requests from legitimate hosts 106a-

106n and attack traffic from attacking host 120 by performing an authentication procedure for new connection requests to a host device within the protected network 100. In one example of authentication, after receiving a TCP SYN packet from any of the external host devices 106a-106n, the mitigation device 102 extracts the sender's internet protocol address (or IP address) from the TCP SYN packet. The mitigation device 102 then sends a specific response back to the IP address (also referred to as host or source address) and waits for the external host device to respond with a correct reply. If the IP address of the external host device, such as attacking host 120, is not a legitimate address, then the external device 120 will not respond, or will respond incorrectly to the specific response from the mitigation device 102. If the IP address of external host device, such as host device 106a, is legitimate, then the external host device 106a will respond with the correct reply.

As noted above, typically, the mitigation device 102 may employ a plurality of different host validation (authentication) procedures/algorithms. The mitigation device 102 tracks each host device trying to access the protected network 100 with the host table 118. The host table 118 is a data structure that stores IP addresses of external devices attempting to connect to the protected network 100. The host table 118 also includes authenticated external devices, the probabilistic data structures, as well as other information, such as predefined filter rules. The host table is 118 is typically allocated a fixed amount of memory for storing this information. Ideally, a mitigation device would keep track of authenticating criteria for each host, so that the next time a mitigation device needs to authenticate a specific host, it can start with the validation procedure that worked last time. However, at least some of the protected devices 108 (e.g., DNS servers) may handle millions of requests every hour from many different external devices 106a-106n. In a conventional DDoS attack mitigation device, the large volume and large number of unique host addresses may make tracking authentication criteria on an individual basis problematic, because it may consume too much system resources. Thus, the conventional DDoS protection solutions are ill-suited to mitigate large-scale attacks.

Advantageously, the embodiments disclosed herein offer a novel approach that can detect and mitigate a large-scale attack campaign where a vast number of attack tools participate in attacking the protected network 100. As noted above, the mitigation device 102 authenticates all external host devices 106a-106n before allowing the external devices to access the protected devices 108 within the protected network 100. As discussed further below, the attack mitigation device 102 is configured to utilize one or more probabilistic data structures to track whether a specific host has failed to authenticate with a specific host validation procedure. In various embodiments, the probabilistic data structures enable the mitigation device 102 to track the behavior of each host with a high degree of confidence and only utilize the validation methods that are likely to actually work with that specific host, thereby reducing the time needed to validate the host and improve the overall user experience.

Additionally, the mitigation device 102 includes an idle timeout length for entries stored in the host table 118. The idle timeout length is the length of time an entry remains in the host table 118 before the entry is removed. During normal operation, the default timeout is sixty seconds, but when the mitigation device 102 is under attack the idle timeout length is reduced to five seconds. The purpose of the shortened idle timeout length is to continually free up system resources of the mitigation device 102 during an attack. The continual turnover of entries in the host table 118 occurs because the mitigation device 102 treats all external host devices 106 as threats until authenticated.

According to exemplary configuration illustrated in FIG. 1, the attack mitigation device 102 may comprise a Client Edge (CE) device. The CE device can provide entry points into the protected network 100. In alternative configuration, the attack mitigation device 102 may comprise a virtual device. In other words, at least some of the embodiments do not require the attack mitigation device 102 to be a physical hardware device or to be located in a particular part of the network infrastructure, as long as the attack mitigation device 102 can be in the path of the incoming traffic to the protected network 100.

Figure 2:
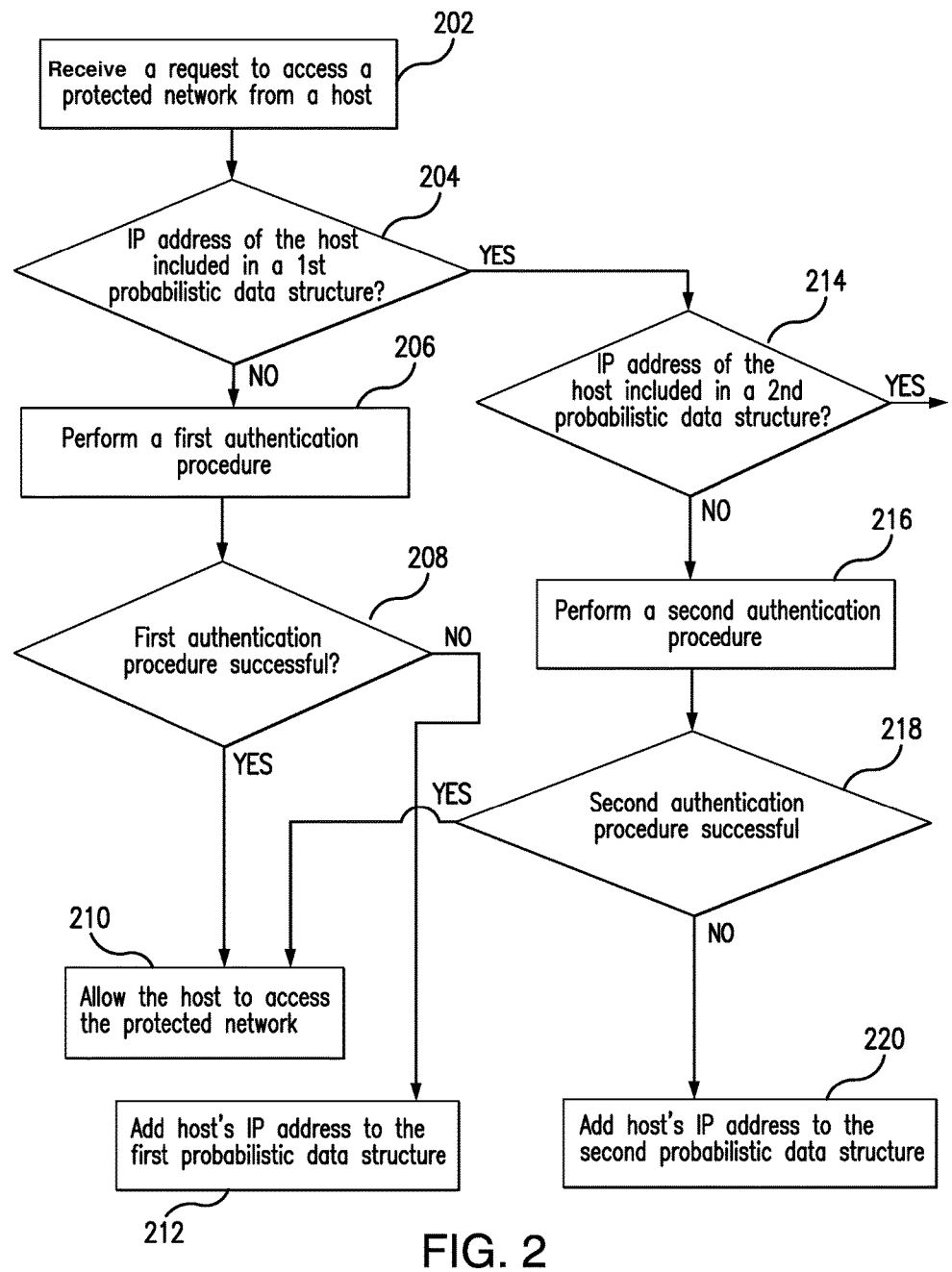
FIG. 2 is a flowcharts illustrating a method in accordance with the illustrated embodiments.

FIG. 2 shows an exemplary and non-limiting flowchart illustrating a method for mitigating network attacks in accordance with certain illustrated embodiments. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, in the first step 202, an incoming packet containing a request to access a protected device from an external host device is intercepted by the mitigation device 102. Next, the mitigation device 102 compares the host address acquired from the incoming access request to a list of entries in the host table 118 to determine if the IP address of the external host device exists in the host table and if it was previously authenticated. It should be noted that all the steps described below are performed by the mitigation device 102 only if the host has not been authenticated yet. Once the host is authenticated, the mitigation device 102 allows the host to access the protected network for some predetermined period of time without doing anymore challenges/tests for the host to pass. Accordingly, if the mitigation device 102 determines that the IP address of the requesting host does not exist in the host table 118 the mitigation device 102 analyzes the received packet. In one embodiment, all incoming packets are inspected and validity tests are performed to ensure that the packets are well formed. For example, the validity tests determine if the packets are fragmented and need reassembly, if the length of the packet matches the length according to packet header, is the IP header checksum valid, is the TCP checksum valid, and if the packet version and header match, to list a few examples. Additionally, the mitigation device 102 also obtains the origination (host) and destination IP addresses from the packet header. If the packets do not pass all the validity checks then the packets are dropped and the connection is terminated by the mitigation device 102.

After passing the validity tests, predefined filter rules and policies may be applied at least in some embodiments. The predefined filter rules and policies are user-defined rules that dictate how specific network traffic is handled. For example, a filter rule could be created to always allow all traffic from specified servers or to always allow all network traffic that originates from a particular individual's host device IP address. Similarly, the predefined filter rules and policies are used to block all traffic from a specific IP address, a range of IP addresses, or any network traffic that arrives on specified ports to list a few other examples.

According to an embodiment of the present invention, in step 204, the attack mitigation device 102 searches for the IP address in a first probabilistic data structure representing IP addresses of hosts having failed to authenticate using a first authentication procedure. A probabilistic data structure is preferably a space-efficient data structure that is used to test whether an element is a member of a set. Some examples of probabilistic data structures are Bloom filters, cuckoo hash tables, random binary tree filters, random tree filters, rapidly-exploring random tree filters, skip list filters, and treap filters, to list a few examples.

The probabilistic data structure operates in conjunction with the host table 118. In a typical implementation, the host table 118 is the primary storage location for pending and authenticated host addresses. According to an embodiment of the present invention, in order to improve efficiency of host authentication procedures, the mitigation device 102 stores the IP addresses of external devices that failed to be authenticated using a specific authentication method in a corresponding probabilistic data structure.

In one embodiment, the mitigation device 102 uses a Bloom filter as the probabilistic data structure. With Bloom filters, false positives are possible, but false negatives are not. That is, it is possible for a search of the Bloom filter to indicate that an element exists in the Bloom filter even when it does not. The Bloom filter will never indicate, however, that an element does not exist in the Bloom filter when it actually does.

Two consequences of using Bloom filters are that false positives can occur, which could result in connection requests from legitimate traffic not being able to connect, and the potential for false positives increases as more IP addresses are added to the Bloom filter data structure. However, the occasional false positive is an acceptable trade-off for the ability to handle the huge increase in network traffic with minimal disruption to majority of legitimate devices. Furthermore, at least in some embodiments, the mitigation device 102 could handle the false positives by performing the skipped tests later in time if the remaining ones fail to authenticate the host. In other words, the mitigation device 102 could simply use the probabilistic filter to change the order in which authentication procedures are performed.

In another embodiment, the mitigation device 102 uses cuckoo hashing as the probabilistic data structure. Cuckoo hashing is a related art multiple-choice hashing scheme that gives better space utilization by moving elements around as needed. This technique was originally presented by Pagh and Rodler in Cuckoo Hashing, *Proceedings of the 9th European Symposium on Algorithms* (2001). Cuckoo hashing employs two hash functions and two respective hash tables (T1 and T2), which may be considered to be two portions or subtables of a single cuckoo hash table. Each entry is stored in a bucket of T1 or a bucket of T2, but never in both.

In response to determining that the IP address is not included in the first probabilistic data structure (decision block 204, "no" branch), in step 206, the mitigation device 102 performs a first authentication procedure, such as, SYN-ACK authentication procedure, for example, if the mitigation device 102 determines in step 202 that the incoming packet is a SYN packet, although other types of protocol session initiations are also contemplated (e.g., port knocking, etc.).

Next, in step 208, the mitigation device 102 determines whether the first authentication procedure results in successful authentication of the source host. Responsive to a determination that the authentication was successful (decision block 208, "yes" branch), the external host device (e.g., host device 106*a*) is considered legitimate by the mitigation device 102. If the incoming packet is sent by a legitimate host, the mitigation device 102 allows the packet to continue to its destination unimpeded, once the source host device is authenticated (step 210).

Responsive to a determination that the authentication was not successful (decision block 208, "no" branch), the IP address of the originating host (e.g., attack source device 120*a*) is added to the first probabilistic data structure representing IP addresses of hosts having failed to authenticate using the first authentication procedure.

According to an embodiment of the present invention, in response to determining that the IP address of the originating host is included in the first probabilistic data structure indicative of previous authentication failure using a first authentication procedure (decision block 204, "yes" branch), in step 214, the mitigation device 102 searches for the same IP address in a second probabilistic data structure representing IP addresses of hosts having failed to authenticate using a second authentication procedure. In various embodiments, the second probabilistic data structures may be also implemented as any of the following: Bloom filters, cuckoo hash tables, random binary tree filters, random tree filters, rapidly-exploring random tree filters, skip list filters, treap filters, and the like.

In response to determining that the IP address is not included in the second probabilistic data structure (decision block 214, "no" branch), in step 216, the mitigation device 102 performs a second authentication procedure. For example, the mitigation device 102 could issue one or more challenges to clients requesting connections to ensure that those devices are who they say they are. One example of a challenge could be to send a particular Java Script as a response. In this way, the queried device would have to execute the received challenge JavaScript, generate the cookie, and be able to re-send the original HTTP request with the JavaScript-generated cookie. Devices spoofing or impersonating the identity of others would not be able to respond with the correct data, and their rogue nature could be revealed.

Next, in step 218, the mitigation device 102 determines whether the second authentication procedure results in successful authentication of the source host. Responsive to a determination that the second authentication procedure was successful (decision block 218, "yes" branch), the external host device (e.g., host device 106*a*) is considered to be legitimate by the mitigation device 102. If the incoming packet is sent by a legitimate host, the mitigation device 102 allows the packet to continue to its destination unimpeded, once the source host device is authenticated (step 210).

Responsive to a determination that the authentication was not successful (decision block 218, "no" branch), the IP address of the originating host (e.g., attack source device 120*a*) is added to the second probabilistic data structure representing IP addresses of hosts having failed to authenticate using the second authentication procedure.

According to an embodiment of the present invention, in response to determining that the IP address of the originating host is included in the second probabilistic data structure as well (decision block 214, "yes" branch), the mitigation device 102 searches for the same IP address in another probabilistic data structure representing IP addresses of hosts having failed to authenticate using yet another authentication procedure. In various embodiments, the mitigation device 102 keeps going on until all predefined authentication methods are exhausted.

As noted above, in one embodiment, the mitigation device 102 employs Bloom filters or similar set membership testers as probabilistic data structures. The Bloom filters include a collection of hash functions, a bit array, and associated logic for applying extracted IP address of the incoming access request to the filter. Each filter is used to determine whether a host has failed to authenticate with a specific authentication method. In other words, each probabilistic data structure (each Bloom filter) is associated with a single attribute of a host (i.e., failed authentication procedure) being tracked by the mitigation device 102.

In another embodiment, the Bloom filters can be used as byte arrays (byte vectors) to track multiple attributes of a host. For example, a single Bloom filter can be used as an array of K bytes, wherein each bit of each element of the Bloom filter byte vector represents a different attribute (i.e., a failed authentication procedure associated with a corresponding host). In this embodiment, during the filter lookup (search), the mitigation device 102 may compute the hash functions producing hash values that extract the byte containing the results and perform logical AND operation of the produced hash values in the array. The bits in the resulting value are indicative of the attributes for a specific host.

Another characteristic of Bloom filters (at least in the most basic Bloom filters) is that the membership of an element typically cannot be withdrawn from a Bloom filter (i.e., once an element is added to the Bloom filter, its membership cannot be removed). The inability to withdraw the membership of elements poses a problem for the mitigation device 102, as limited size of the host table 118 requires removal of old entries as it fills up and space should be made for new elements.

A modified version of a Bloom filter (referred to hereinafter as "all-inclusive Bloom filter") and a plurality of Bloom filters associated with a particular time period may be employed by the mitigation device 112 which would allow removal of elements to be simulated. In this embodiment, the mitigation device 112 may keep a plurality of Bloom filters for each predefined period of time. After the passage of the predefined period of time (e.g., N days, or N hours, where N is an appropriate number), the mitigation device 112 may clear both the all-inclusive Bloom filter and the plurality of the Bloom filters associated with the newly expired period. In one embodiment, the mitigation device 112 may modify the all-inclusive Bloom filter by performing a logical OR operation on all entries from the corresponding plurality of the Bloom filters. Accordingly, the updating of the all-inclusive Bloom filter effectively generates a summary that does not include the information associated with the newly expired period.

Furthermore, in this embodiment, the mitigation device 102 may utilize the all-inclusive Bloom filter during the host attribute lookup (search). It should be noted that when a new host IP address is inserted into a corresponding Bloom filter (see steps 212 and 220 described above), the mitigation device 102 adds this IP address to both the all-inclusive Bloom filter and a corresponding Bloom filter for the current time period, which substantially ensures that this information will persist after the passage of the predefined period of time associated with the current period.

Figure 3:
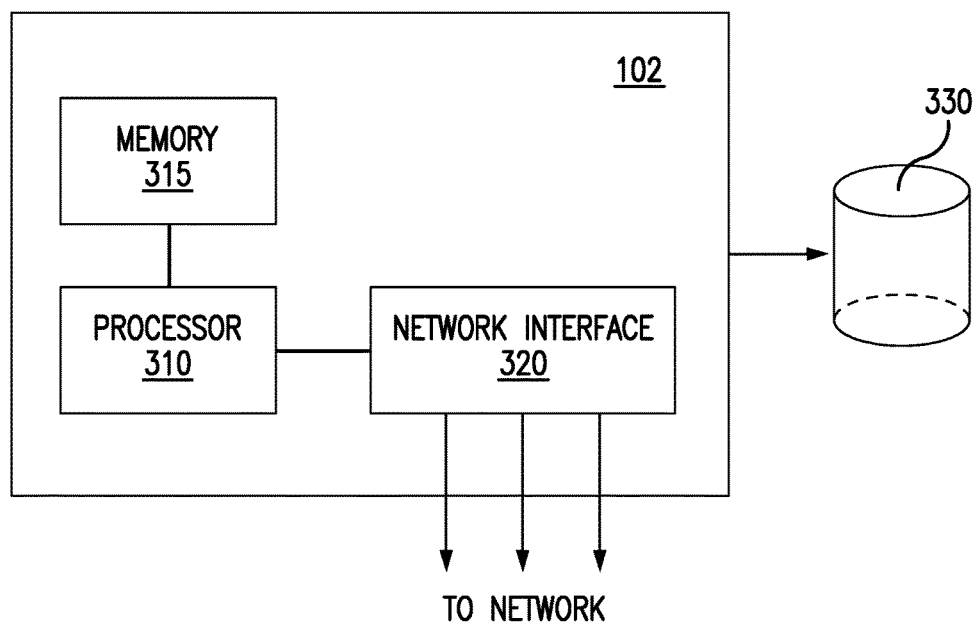
FIG. 3 is a block diagram of the attack mitigation device of FIG. 1, in accordance with an embodiment of the present invention.

With reference now to FIG. 3, illustrated is an exemplary and non-limiting block diagram of the attack mitigation device 102 constructed according to an illustrated embodiment. The attack mitigation device 102 is communicatively coupled to the protected network 100 and to the database 330 (i.e., storage medium 116 storing host tables 118), as shown in FIG. 3, and is at least configured to execute the method for mitigating network attacks as described in greater detail above. The attack mitigation device 102 preferably includes a processor 310 coupled to a memory 315 and a network-interface module 320. The network-interface module 320 allows the communication with the protected network 100. The processor 310 uses instructions stored in the memory 315 to execute attack detection tasks as well as to control and enable the operation of the network-interface module 320.

In summary, various embodiments of the present invention disclose a novel approach to track various host attributes (i.e., whether a specific host has failed to authenticate with a specific host validation procedure) by employing various probabilistic data structures. The disclosed approach provides a number of advantages. In one aspect, software programming code embodying the present invention provides an ability to validate each host using authentication methods that are highly likely to work with that host rather than going through a series of authentication procedures one at a time. In another aspect, using this approach, the attack mitigation device 102 determines the likelihood of a particular validation procedure being a successful one based on historical information. In the event of a false positive, the attack mitigation device can fall back to iterating through other authentication methods. As yet another advantage, although the method depicted in FIG. 2 is described with reference to the TCP and HTTP validation procedures, it is not limited thereto. The disclosed processing functionality performed by the attack mitigation device 102 may be applicable to other protocols as well.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for mitigating network attacks, the system comprising:
    a protected network comprising a plurality of devices; and
    one or more attack mitigation devices communicatively coupled to the protected network, wherein the one or more attack mitigation devices are configured and operable to:
        receive a request to access the protected network from a host having an IP address;
        determine whether the IP address of the host is included in a first probabilistic data structure having a host table representing host addresses of hosts having failed to authenticate using a first authentication procedure;
        perform the first authentication procedure, responsive to a determination that the IP address of the host is not included in the first probabilistic data structure;
        allow the host to access the protected network, responsive to successful completion of the first authentication procedure; and
        update the first probabilistic data structure to include the IP address of the host, responsive to unsuccessful completion of the first authentication procedure, wherein host addresses in the host table in the first probabilistic data structure are removed after a predetermined idle timeout period contingent upon an amount of attacks directed upon the protected network.

2. The system as recited in claim 1, wherein the one or more attack mitigation devices is further configured to:
    determine whether the IP address of the host is included in a second probabilistic data structure representing host addresses of hosts having failed to authenticate using a second authentication procedure, responsive to a determination that the IP address of the host is included in the first probabilistic data structure;
    perform the second authentication procedure, responsive to a determination that the IP address of the host is not included in the second probabilistic data structure;
    allow the host to access the protected network, responsive to successful completion of the second authentication procedure; and
    update the second probabilistic data structure to include the IP address of the host, responsive to unsuccessful completion of the second authentication procedure.

3. The system as recited in claim 2, wherein the first probabilistic data structure and the second probabilistic data structure comprise cuckoo hash tables.

4. The system as recited in claim 2, wherein the first probabilistic data structure comprises a first Bloom filter bit vector and the second probabilistic data structure comprises a second Bloom filter bit vector.

5. The system as recited in claim 3, wherein the cuckoo hash tables are constructed using at least two hash functions.

6. The system as recited in claim 4, wherein the first Bloom filter bit vector and the second Bloom filter bit vector are associated with a time period.

7. The system as recited in claim 6, wherein the one or more attack mitigation devices are further configured to generate a third Bloom filter bit vector, wherein the third Bloom filter bit vector includes the first and the second Bloom filter bit vectors.

8. The system as recited in claim 2, wherein the first probabilistic data structure and the second probabilistic data structure are stored within a host table.

9. The system as recited in claim 7, wherein the one or more attack mitigation devices are further configured to clear the first, second and third Bloom filter bit vectors upon expiration of the time period.

10. The system as recited in claim 1, wherein the one or more attack mitigation devices comprise virtual devices.

* * * * *